2,878,575

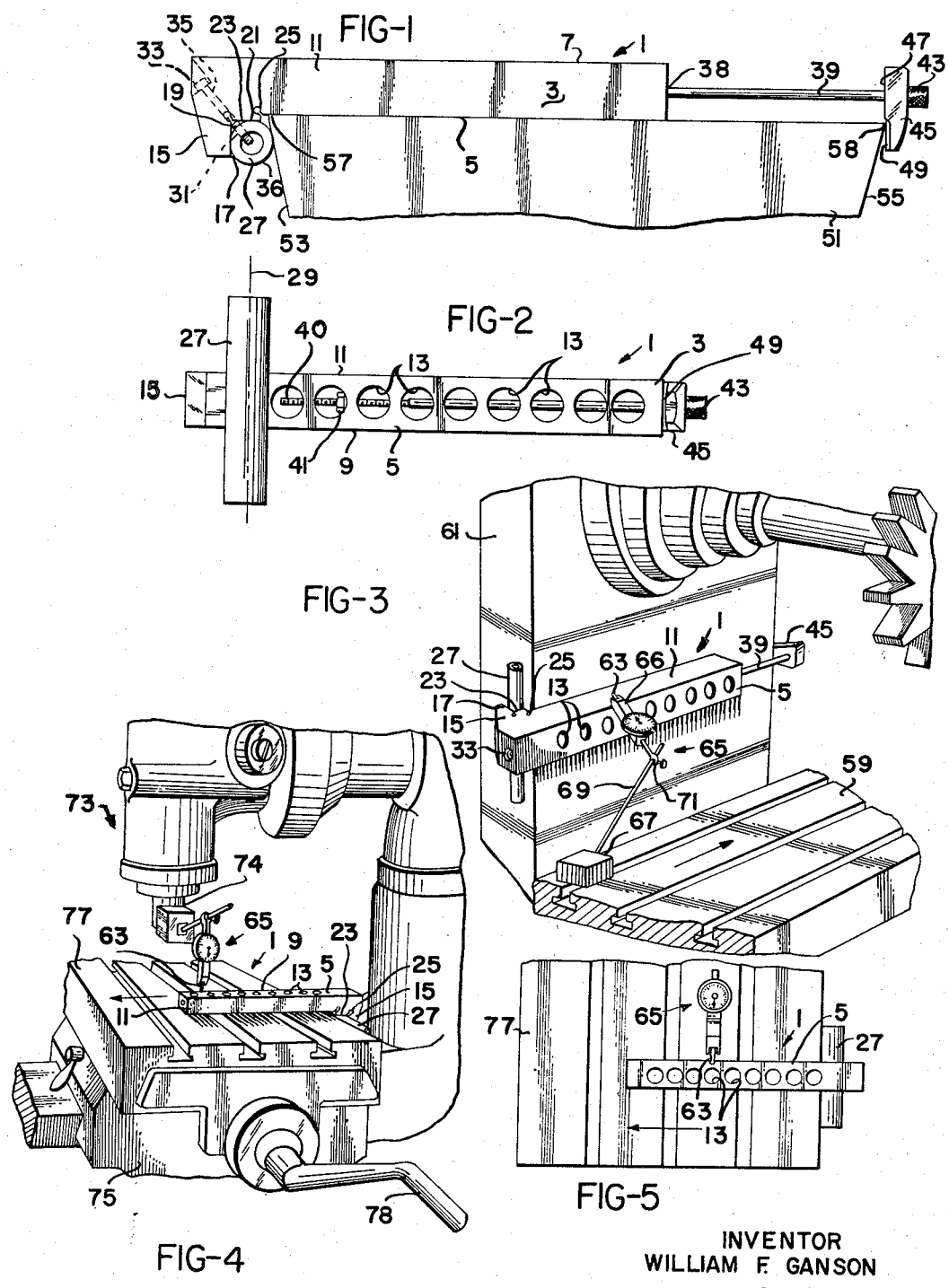

TANGENT SQUARE

William F. Ganson, West Liberty, Ohio

Application October 16, 1956, Serial No. 616,225

8 Claims. (Cl. 33—174)

My present invention relates to precision squares.

The invention particularly contemplates the provision of a precision square which is especially adapted for accurately measuring right angles and which is of very considerable utility in aligning components of machine tools.

An important object of this invention is the provision of a precision square instrument which is so constructed and arranged that it readily accommodates itself to and clampingly receives in firm engagement slides of machine tools, for example.

Yet another object of the invention is to provide a precision square instrument which is of simple and improved construction, which is composed of few readily assembled parts, all so constructed and arranged as to preclude the liability of derangement of the same; this device is positive and accurate in operation, has a relatively small size and weight, and which instrument has proved thoroughly efficient for the attainment of the ends for which it is designed.

These and other allied objects and advantages of the invention will be more fully understood by reference to the following detailed description and accompanying drawings wherein:

Figure 1 illustrates in side elevation the instrument of invention positioned on a slide of a lathe, for example, the slide being shown in fragmentary view;

Figure 2 is a plan view of the precision square instrument of invention;

Figure 3 is a fragmentary view in perspective illustrating the mode of using the precision square instrument in the alignment of a slide of a horizontal milling machine relative to the table of the machine;

Figure 4 is a fragmentary view illustrating the use of the precision square instrument of invention in the squaring of a table of a vertical milling machine relative to the head of the machine; and Figure 5 is a fragmentary view in plan of a portion of the structure of Figure 4 illustrating the arrangement of the precision square instrument with relation to a dial indicator with the alignment of the table of the milling machine of Figure 4 with relation to the head of the milling machine in a vertical plane.

Referring to the drawings with greater particularity, the numeral 1 designates a generally longitudinally extending body having a longitudinally extending base 3 of hardened tool steel forming a leg of the body 1.

The base 3 has an upper horizontally extending planar surface 5 and a lower parallel horizontally extending planar surface 7 (Figure 1). The base 3 has a transverse cross section in the form of a rectangle and the opposite lateral sides 9, 11 of the base are planar and parallel.

The base 3 is provided with a plurality of vertically extending apertures 13, which both reduce the weight of the instrument and provide for the securing of a clamping means to the instrument as noted more particularly hereinafter.

Extending vertically of the end of base 3 is a relatively short leg 15 having a planar face 17 which extends perpendicularly to the base leg 3 and forms therewith a right angle. This arrangement provides a bight or corner 19 on the body.

A step 21 of the base, most suitably formed integral with the base, is positioned in the bight. This step 21 has an upper planar horizontally extending face 23 which is parallel to the planar face 5. The base 3 is grooved transversely at 25 to provide for grinding of the adjacent edge of the step and base.

The step 21 forms a seat in the bight for a cylinder 27 which is hollow and which has a major axis indicated at 29. This cylinder is of hardened tool steel and preferably ground to a degree of accuracy such that measurements within one-ten thousandths of an inch may accurately be effected.

Cylinder 27 is provided with an interior threaded opening 31 which receives in screw threaded engagement a headed bolt 33 passing through a bore 35 of the body. The cylinder 27 is drawn securely down on the seat and tangent to the planar face 17 of the short leg 15, as shown in Figure 1.

The outside diameter of the cylinder 27 is somewhat greater than the dimension of the seat in the direction of the length of the body 3 and the cylinder overhangs the seat and extends over the upper horizontal planar face 5 of the body.

In order that the tool may conveniently accommodate itself to various structures such as shown in the drawings, the short leg 15 is of such a height and the cylinder 27 of such a diameter that the outer periphery 36 of the cylinder extends above the top of the leg 15. This prevents interference of leg 15 with structural components of machine tools on which the instrument may be positioned.

The base 3 is provided with adjustable clamping means; for this purpose a longitudinally extending aperture, which communicates with the openings 13 and passes outwardly of the base endwise at 38, receives a rod 39 threaded at its interior end 40 to receive a half nut 41. Carried on the outer end of the rod is a knurled nut 43 and threaded on the rod inwardly of the knurled nut is a clamping element 45. Element 45 has a lower planar face 47 and an upper integral arcuate face 49, as most clearly shown in Figure 2.

The face 49 as viewed in Figure 2 in plan is seen to curve from the center laterally towards the sides of the base and as shown in Figure 1 is adapted to provide line contact with the machine tool component 51 against which it abuts. This line contact inhibits turning or rocking of the clamping mechanism on the machine tool component.

As may be further noted from Figure 1 the clamping element is readily adjusted by extending the rod 39 lengthwise of the base for the accommodation of various widths of machine tool components, the nut 41 on the rod abutting the base in the adjusted position of the nut to retain the rod and base together.

As depicted in Figure 1 the structure of invention is secured in an inverted position on the machine tool component 51, which component is, for example, a cross slide on a lathe and of inverted V-shape.

The cylinder 27 provides line contact with side 53 of the component 51, the altitude of the cylinder extending across the side 53, to provide firm tangential and accurate contact with the side 53. Face 49 of the clamping element 45 provides, as already noted, line contact with the side 55, inhibiting rocking of the structure.

With many machine tool components the apices of the components, as shown at 57, 58 in Figure 1, may be slightly rounded; in the instrument of invention providing the line contact at face 49, and providing for the reception of the apices as at 57 in the region or spacing between the cylinder and the face 5, avoids many errors.

The reception of the apex 57 in the manner shown in Figure 1 is an important feature of the invention.

The use of the device of invention is illustrated in Figures 3, 4 and 5.

Referring now to Figure 3, the numeral 59 in this Figure designates a table of a horizontal milling machine which is adapted to traverse in the direction indicated by the arrow relative to a slide 61 of the machine. The slide 61 mounts the instrument of invention securely and as shown presents lateral planar face 11 of the precision square instrument to an actuable pin 63 of an indicator 65 which is most suitably of the universal type wherein the pin 63 is pivotally adjustable.

The indicator 65 is of a commercially available construction and the pin 63 is adapted to assume various fixed positions as desired with relation to the fork 66 of the indicator. The indicator is itself supported from the table 59 by the combination of a block 67, rod 69 and a screw receiving eye 71.

As is apparent from Figure 3 traverse of table 59 in the direction of the arrow moves the pin 63 across the planar face 11 and the alignment of the slide 61 with the table 59 may thereby be checked. It is to be noted that the cylinder 27 provides for good contact with the V-shaped slide 61.

In Figure 4 there is indicated the essential components of a vertical milling machine indicated generally by the numeral 73 and the indicator 65 is supported from the head 74 while the slide 75 is movable in the direction of the arrow.

With the pin 63 in contact with the lateral face 9 of the precision square instrument the lateral alignment between the head 74 and the slide 75 is checked. By positioning the pin 63 as shown in Figure 5 on the upper face 5 of the precision tool instrument, the vertical alignment of the components of Figure 4 may be checked. As is obvious from Figure 4 a simple rearrangement of the instrument on the table 77 and utilization of the handle 78 will permit of checking the table movements longitudinally relatively to the head.

For the sake of clarity the clamping means have been eliminated from the structures shown in Figures 4 and 5, and it will be understood that in many instances, particullarly where surfaces are hand checked, the clamping means need not be utilized.

There has thus been described a precision square instrument which includes the combination of a longitudinally extending base, the transverse cross section of which is suitably a rectangle or square and the opposite sides of which base are planar and parallel; the base having a leg most suitably projecting from one end thereof to form the base at right angle.

In the bight formed between the base and the leg a cylinder is positioned to extend perpendicular to the length of the base, across the base and to project laterally from the base on each side thereof. Such arrangement provides an extremely accurate measuring tool.

It will be understood that this invention is susceptible to modification in order to adapt it to different usages and conditions and accordingly, it is desired to comprehend such modifications within this invention as may fall within the scope of the appended claims.

I claim:

1. A precision square instrument comprising a body having a longitudinally extending base provided with upper and lower horizontally extending parallel faces and opposed planar lateral faces extending perpendicularly to the horizontal faces and forming a first and longer leg of the body, a vertically extending second and shorter leg projecting above the first leg adjacent a first longitudinal end of the first leg, said second leg having a planar face extending perpendicularly to the upper face of the first leg and forming therewith a right angle thereby providing a bight on the body between the legs, a step of the base projecting above the base in the bight and being provided with an upper surface parallel to the upper surface of the base forming a seat, a cylinder on the seat having the major axis thereof extending perpendicularly to the body length, the outer periphery of the cylinder extending beyond the seat over the upper surface of the base forming with the base a spacing, and the outer periphery of the cylinder extending above the top of the second leg, the longer of the legs of said body having the said upper planar face thereof extending uninterruptedly from the said seat to the second longitudinal end of said body.

2. A precision square instrument comprising a body having a longitudinally extending base provided with upper and lower horizontally extending parallel faces and forming a first leg of the body, a vertically extending second and shorter leg projecting above the first leg adjacent an end of the first leg, said second leg having a planar face extending perpendicularly to the upper face of the first leg and forming therewith a right angle thereby providing a bight on the body between the legs, a step of the base projecting above the base in the bight and being provided with an upper surface parallel to the upper surface of the base forming a seat, a cylinder on the seat having the major axis thereof extending perpendicularly to the body length, the outer periphery of the cylinder extending beyond the seat over the upper surface of the base and the outer periphery of the cylinder extending above the top of the second leg, and clamping means carried on the other end of the base extending beyond the base vertically and cooperable with the base and cylinder for clamping a structure therebetween.

3. In combination, in a precision square instrument, a body comprising a longitudinally extending base having upper and lower horizontally extending parallel faces, a step of the base at one end of the body and having a surface extending in a plane parallel to that of the upper face of the base and forming a seat, a cylinder secured on the seat raised above the base thereby and having the outer periphery thereof extending beyond the seat towards the other end of the base, said cylinder having the major axis thereof extending perpendicularly to the body length, and adjustable clamping means on said other end of the base extending above the base and cooperable with the base and cylinder to retain a structure therebetween.

4. In a precision square instrument, in combination, a longitudinally extending base the transverse cross-section of which is a rectangle and the opposite sides of which are parallel, the base having upper and lower horizontally extending planar faces, a vertically extending leg projecting above the base from an end of the base, said leg having a planar face extending perpendicularly to the upper face of the base and forming therewith a right angle thereby providing a bight on the body between the leg and base, a cylinder in the bight secured to the body and extending perpendicularly to the length of the base across the base and projecting laterally from the base on each side thereof, said base having a plurality of spaced apertures extending vertically therethrough and said base being provided with a longitudinal bore providing communication between the apertures, a rod slidable in the bore and threaded at an interior end thereof, a nut adjustable on the threaded interior end of the rod and engageable with the base at an aperture to restrain rod movement, and clamping means carried by an outer end of the rod extending beyond the base vertically and cooperable with the base and cylinder for clamping a structure therebetween in the engaged position of the nut with the base.

5. In a precision square instrument, in combination, a longitudinally extending base the transverse cross-section of which is a rectangle and the opposite sides of which are parallel, the base having upper and lower horizontally extending planar faces, a vertically extending leg projecting above the base from an end of the base, said leg having a planar face extending perpendicularly to the upper face of the base and forming therewith a right angle thereby providing a bight on the body between the leg and the base, a cylinder in the bight secured to the body and extending perpendicularly to the length of the base across the base and projecting laterally from the base on each side thereof, said base having a plurality of spaced apertures extending vertically therethrough and said base being provided with a longitudinal bore providing communication between the apertures, a rod slidable in the bore and threaded at an interior end thereof, a nut adjustable on the threaded interior end of the rod and engageable with the base at an aperture to restrain rod movement, and clamping means carried by an outer end of the rod, said clamping means having a portion thereof extending vertically beyond the base and cooperable with the base and cylinder for clamping a structure therebetween in the engaged position of the nut with the base, said portion of said clamping means having a convex arcuate surface as viewed in plan.

6. A precision square instrument comprising a body having a longitudinally extending base provided with opposed parallel upper and lower horizontally extending faces and a planar lateral face extending perpendicularly to the horizontal faces, a step of the base projecting adjacent a first longitudinal end of the base above the base from the said upper face thereof and provided with an upper surface extending parallel to the upper planar face of the base and forming a seat, a cylinder secured on the upper surface of the seat and having the major axis thereof extending perpendicularly to the length of the body, the outer periphery of the cylinder extending beyond the seat towards the second longitudinal end of the base and over the upper face of the base forming a spacing with the said upper face, the said upper face extending uninterruptedly from the seat to the second longitudinal end of the base.

7. A precision square instrument comprising a body having a longitudinally extending base provided with opposed parallel upper and lower horizontally extending planar faces and opposed planar lateral faces extending perpendicularly to the horizontal faces and forming a first leg of the body, a vertically extending second and shorter leg projecting from the first leg adjacent a first longitudinal end of the first leg, said second leg having a planar face extending perpendicularly to the said upper planar face of the said first leg and forming with the said first leg a right angle thereby providing a bight on the body between the legs, a step of the base projecting above the base in bight and provided with an upper surface parallel to the upper planar face of the first leg and forming a seat, the said upper planar face of the first leg being otherwise uninterrupted over the length thereof to a second longitudinal end of the first leg from the seat, a cylinder secured on the seat and having the major axis thereof extending perpendicularly to the length of the body, the outer periphery of the cylinder extending beyond the seat towards the said second longitudinal end of the first leg and over the upper face of the base forming a spacing with the base.

8. A precision square instrument comprising, in combination, a body having a longitudinally extending base the transverse cross-section of which is a rectangle and the opposite sides of which are parallel the base having upper and lower horizontally extending planar faces and vertically extending lateral faces, said base forming a first leg of the body, a vertically extending second and shorter leg projecting from the first leg adjacent a first longitudinal end of the first leg, said second leg having a planar face extending perpendicularly to the said upper planar face of the said first leg and forming with the said first leg a right angle thereby providing a bight on the body between the legs, a step of the base projecting above the base in the bight and provided with an upper surface parallel to the upper planar face of the first leg and forming a seat, the said upper planar face of the first leg being otherwise uninterrupted over the length thereof to a second longitudinal end of the first leg from the seat, a cylinder secured on the seat and having the major axis thereof extending perpendicularly to the length of the body and projecting laterally from the base on each side thereof, the outer periphery of the cylinder extending beyond the seat towards the said second end of the first leg and over the upper face of the base forming a spacing with the base.

References Cited in the file of this patent

UNITED STATES PATENTS

| | | |
|---|---|---|
| 1,476,573 | Allen | Dec. 4, 1923 |
| 1,679,084 | Hooper | July 31, 1928 |
| 2,059,740 | Minchew | Nov. 3, 1936 |
| 2,075,008 | Damm | Mar. 30, 1937 |
| 2,285,741 | Meyer | June 9, 1942 |
| 2,325,904 | Brebeck | Aug. 3, 1943 |
| 2,429,517 | Knapp | Oct. 21, 1947 |
| 2,435,799 | Rizor | Feb. 10, 1948 |
| 2,548,917 | Spall | Apr. 17, 1951 |
| 2,565,924 | Kraft | Aug. 28, 1951 |
| 2,574,112 | Kopec | Nov. 6, 1951 |
| 2,756,508 | O'Grady | July 31, 1956 |